United States Patent [19]
Sutherland

[11] Patent Number: 6,146,535
[45] Date of Patent: Nov. 14, 2000

[54] ORGANIC RECOVERY METHOD USING HOLLOW FIBER MICROFILTERS

[76] Inventor: George Sutherland, 14 Emmerson Street, Fredericton, New Brunswick, Canada, E5B 6G8

[21] Appl. No.: 09/198,264

[22] Filed: Nov. 24, 1998

Related U.S. Application Data

[63] Continuation-in-part of application No. 08/772,252, Dec. 23, 1996, abandoned, which is a continuation-in-part of application No. 08/644,919, May 29, 1996, abandoned, which is a continuation-in-part of application No. 08/265,153, Jun. 24, 1994, abandoned.

[51] Int. Cl.[7] ............................ B01D 61/14; B01D 61/16
[52] U.S. Cl. .................. 210/637; 210/500.23; 210/650; 210/651; 210/774; 210/787; 210/806
[58] Field of Search .............................. 210/500.23, 637, 210/638, 639, 640, 641, 650, 651, 774, 787, 799, 806

[56] References Cited

U.S. PATENT DOCUMENTS

| | | | |
|---|---|---|---|
| 4,020,230 | 4/1977 | Mahoney et al. | 428/398 |
| 4,082,658 | 4/1978 | Fritzsche et al. | |
| 4,846,976 | 7/1989 | Ford | 210/651 |
| 4,886,603 | 12/1989 | Taylor et al. | 210/641 |
| 5,900,674 | 5/1999 | Kansa et al. | 210/640 |

*Primary Examiner*—Joseph W. Drodge
*Attorney, Agent, or Firm*—McFadden, Fincham; Ian Fincham

[57] ABSTRACT

There is disclosed a system for separating oil and other immiscible organic materials from a liquid body or from a mixture with an aqueous medium. The system includes the use of a plurality of microporous hollow fibers which may be arranged in any number of arrangements such as bundles, intersecting arrangements, divergent patters or in a mat-like arrangement or a combination of the foregoing. The hollow fibers are in communication with a pressure source in order to draw or force the contaminant into contact by the shell side of the fibers and through the micropores thereof. Discrete phase separation from a mixture in substantially pure form, i.e. no free phase contamination is achievable. This system provides a substantial advantage over existing arrangements in that extraction efficiency is greatly enhanced in any number of environments.

24 Claims, 12 Drawing Sheets

("X = Example 9,10A + 10B")
("O = Example 10C") (minimum values; assumes use of all available fiber)
(See other examples for higher recovery rates)

ORGANIC RECOVERY METHOD USING HOLLOW FIBER MICROFILTERS

This application is a continuation-in-part of U.S. Ser. No. 08/772,252 filed Dec. 23, 1996, now abandoned, which is a continuation-in-part of U.S. Ser. No. 08/644,919 filed May 29, 1996, now abandoned, which is a continuation-in-part of U.S. Ser. No. 08/265,153 filed Jun. 24, 1994, now abandoned.

FIELD OF THE INVENTION

The present invention relates to an organic recovery system and method, the organic being recovered from an aqueous mixture containing the organic. More particularly, the present invention relates to the removal of an organic material from an aqueous mixture to the exclusion of the aqueous phase of the aqueous mixture.

BACKGROUND OF THE INVENTION

With the seemingly regular occurrence of oil tankers running aground and dumping their contents into the world's waterways and inland fuel spills contaminating acquifers and soils, there has been a significant amount of activity in the oil spill clean-up art. Various methods have been set forth in an attempt to contain the oil once the same is spilled in order to prevent damage to aquatic life and other aspects of the environment. Chemical additives, porous materials, as well as various sheets and barriers have been proposed in the prior art, typical of the latter being U.S. Pat. No. 5,120,598, issued to Robeson et al. Jun. 9, 1992. The Robeson et al. disclosure provides a mat product composed of polyvinyl alcohol ultra-fine fibers. The same are formed into a mat and the mat is brought into contact with the oil spill. The result is that the fibers adsorb the oil.

The Robeson et al. arrangement, although a meritorious and useful product, still requires removal from an oil slick once the fiber mat is saturated. In addition, presumably the oil must be removed from the mat before the same can be used in a similar manner. Clearly this is a cumbersome procedure and costly from a time point of view. One expects similar difficulties with other mats and adsorbent.

Nohmi et al., in U.S. Pat. No. 4,229,297, teach a method of separating oil from an oil containing liquid. This reference is generally useful for oil separation, however, there is an inherent limitation in the Nohmi et al. methodology. The reference indicates that the mixture may be separated into distinct phases by forcing the mixture into contact with the inside surface (lumen) of the microporous hydrophobic hollow fibers. In this regard, the flow in the Nohmi et al. reference is referred to as "down-bore". This refers to the fact that the two phase mixture is forced down the lumen of the fiber as opposed to being passed into contact with the outside surfaces of the fiber, i.e. shell side feed. It is known in the art that it cannot be predicted what the pressure drop over a given length of fiber will be for a two-phase down-bore feed as in the feed type in the Nohmi et al. reference. Additionally, there is an absolute maximum amount of water which can be fed per fiber, above which "water breakthrough" occurs. Accordingly, the Nohmi et al. teachings would not be useful to one trying to recover as much water free oil as possible from an oil/water feed without exceeding the pressure at which water and oil both permeate through the fiber walls (water breakthrough). When the water breakthrough pressure is reached, it is no longer possible to obtain the desired result(s), water free separate phase oil and simultaneously oil free separate phase water.

U.S. Pat. No. 5,073,261, dated Dec. 17, 1991, and issued to Conradi et al., provides a collapsible container having an inlet and an outlet and being composed of a water impervious rubber material. The collapsible container is connected to an inlet for charging an oil-water mixture into the container. The container is configured with baffles, etc., to specifically contain the oil therein, the oil container subsequently being towed to a further location for removal of the oil. This arrangement does not result in the immediate removal of the oil from the water body containing the oil spill, but rather separates the oil from the water body containing the same while the container, having the oil therein, is still in the water. There is therefore, a possibility that residues may remain on the water surface even though a substantial amount of the oil is contained within the container floating in the water.

Coté et al., in U.S. Pat. No. 5,248,424, issued Sep. 28, 1993 provides a further variation on hollow fiber separation technology. The reference discloses the use of hollow fibers for separating various compounds. The Coté et al. arrangement has been designed to handle solid particulate removal from an aqueous mixture as opposed to liquid-liquid separation. This is further evinced by the fact that the Coté et al. method involves the pretreatment of the hydrophobic fibers to render them hydrophilic. This is an absolutely essential step in the manufacture or the pretreatment regime. In a situation where the Coté et al. arrangement were used to separate oil, the oil would eventually permeate through, along with the water, into the fiber thus negating the purpose of separation.

In view of the structure of Coté et al. and together with the teachings in the disclosure, it is clear that the Coté et al. arrangement and method would not be adequate for separation of an organic liquid disposed within an aqueous medium. In several embodiments, the fibers are essentially unsupported and are disposed in arcuate relationship with one another. Such an arrangement has effect in only certain limited conditions. The arrangement would not be effective in, for example, an oil spill situation on a large body of water. The Cote et al. reference makes no provision for fiber dimensional changes which occur when the fibers are in contact with, for example, oil. In this situation, the Coté et al. arrangement would simply "bundle" or "clump". This inherently leads to efficiency limitations since the available area of the fibers is reduced and, therefore, the degree of contact with the mixture is reduced. Accordingly, it is clear that the teachings of the Coté et al. only relate to non-oil based separations.

Taylor, in U.S. Pat. No. 4,886,603, teaches a separation method where diesel oil contaminated with water can be apparently dewatered by pumping the mixture which is an emulsion or solution through the lumen of microporous polyvinyledene fluoride (PVDF), hollow fiber modules capable of separating the oil as the permeate. The arrangement employed to facilitate this separation is a two-stage hydrophobic microporous hollow fiber module. In the Taylor teachings, it is clear that the Taylor reference relies on forcing an emulsion or solution of oil in water down the lumen of the hollow fibers in order to apparently achieve separation of the oil from the water. Since the Taylor reference is directed to emulsified and soluble oils and therefore, the Taylor reference achieves only a partial recovery of the permeate which is water-free oil in a single step and requires the passage of a retentate into a second chamber equipped with a hydrophilic membrane in order to recover free phase water. Notably, neither step achieves quantitative separations. The Nohmi et al. drawbacks hereinbefore detailed apply equally to Taylor discussed hereinbefore and Ford discussed hereinafter.

A further reference which teaches separation of organic aqueous mixtures is Ford, in U.S. Pat. No. 4,846,976. The Ford reference makes the point that oil removal from an oil-water mixture is best conducted if the mixture is forced through the lumens. In this regard, the Ford teachings are quite similar, from a broad point of view, to those in the Taylor and Nohmi et al. references and as such, the teachings of Ford have inherent problems with permeate quality in terms of efficiency of phase separation without contamination.

There has been a significant amount of work performed in this art, resulting in a significant number of patents related to the instant invention. The following represents a list of patents forming a portion of the body of the United States prior art in this field. U.S. Pat. Nos. Re. 31,087, 2,523,091, 3,487,927, 3,669,275, 3,737,043, 3,872,014, 4,126,556, 4,172,039, 4,197,204, 4,371,441, 4,469,170, 4,663,037, 4,668,401, 4,670,156, 4,772,390, 4,897,191, 4,902,418, 4,944,877, 5,013,437, 5,094,750, 5,151,191, 5,169,529, 5,169,530, 5,174,900 and 5,183,566.

Other generally related art includes Canadian Patent Nos. 1,221,645, 1,245,567, 1,290,257, 1,323,582, 2,007,917, 2,027,114, 5,202,023, 5,207,906, 5,209,852, 5,225,079, 5,282,975, 5,352,361, 5,429,742, and 5,480,553.

In view of what the prior art has proposed as possible solutions for cleaning up oil spills and removal of organic materials which may be environmentally hazardous, there clearly exists a need for a more advanced system which is capable of removing and recovering the organic material from an aqueous system which is efficient, reliable and results in substantially complete separation of the organic phase from the liquid phase without contamination of one phase within the other. The present invention clearly addresses the solution to this problem and satisfies the desirable result of producing discrete and substantially pure phases.

SUMMARY OF THE INVENTION

The term "mixture" when discussed in the context of the present invention means an aqueous medium or mixture having at least two phases—i.e. not aqueous solutions or oil in water emulsions.

The term "negative pressure" when discussed in the context of the present invention means a reduced pressure inside the bore of the fiber relative to the outside of the fiber.

One object of one embodiment the present invention is to provide an improved method for oil recovery from an aqueous medium.

A further object of one embodiment of the present invention is to provide a method of recovering a liquid organic compound from a source containing said compound in a mixture with an aqueous medium, the method comprising the steps of:
providing a plurality of hollow hydrophobic microporous fibers, each fiber of said fibers having a shell and a longitudinal bore and micropores extending through each said fiber to the interior of each fiber;
contacting said exterior of the fibers with said source; said micropores having a shape and/or orientation relative to flow of the mixture and a cross-sectional size sufficiently small to exclude the entry into said fibers of said aqueous medium due to surface tension of said aqueous medium but permitting entry into said fibers of said organic compound; and,
inducing a pressure drop across the shell of said fibers, said pressure drop sufficient to separate said organic compound from said aqueous medium by passage of the organic compound into said fibers but insufficient to pass said aqueous medium through said micropores to facilitate removal of said organic compound from said source.

A further object of one embodiment of the present invention is to provide a method of recovering a liquid organic compound from a source containing the compound in an aqueous medium, the method comprising the steps of:
providing a plurality of hollow hydrophobic microporous fibers, each fiber of the fibers having a longitudinal bore and micropores extending through each fiber to the interior of each fiber;
contacting the exterior of the fibers with the source; and
inducing a negative pressure within the longitudinal bore of each fiber relative to the exterior of each fiber, the negative pressure sufficient to draw the organic compound into the fibers but insufficient to draw the aqueous medium through the micropores to facilitate removal of the organic compound from the source.

The hollow fibers may be arranged in an array, a diverging pattern, a parallel pattern, intersecting pattern, bundled into one or more bundles, incorporated into a mat structure or incorporated into a suitable substrate, e.g. a cloth substrate or a polymeric membrane. Many further arrangements will be readily apparent to those skilled in the art.

Suitable examples of polyolefin fibers which achieve the desirable results of the present invention are those fibers made by Mitsubishi Rayon such as the Sterapore™, EHF and KPF as well as those fibers manufactured by the Celanese Corporation. The other known microporous hollow fiber membranes may also be employed.

It has been found that some types of fibers, when exposed to oil, "swell" or incur dimensional changes. Use of a stabilizing member for maintaining the fibers in a spaced and connected relation substantially alleviates this drawback and prevents kinking or excess distortion of the fibers, particularly when the same are grouped in a bundle. Suitable materials for this purpose may be polyester thread, teflon thread or any other material which does not substantially swell in the presence of oil. A distinctive advantage with this provision can be realized in that if the bundle of fibers, mat, etc. is stabilized with respect to dimensional changes, the fibers are maintained in a substantially regular spaced manner therefor allowing the passage of an oil or contaminant containing feed stream to pass therethrough while contacting a maximum number of fibers; this, of course, leads to a more efficient system.

Conveniently, the hydrophobic hollow fibers employed in the present invention do not require any pretreatment in order to achieve the results set forth herein. This is in marked contrast what has been indicated in the prior art and specifically the Coté et al. reference that has been discussed herein previously. In the Coté et al. disclosure it was indicated that the hydrophobic fibers had to be treated to render them hydrophillic. In the present invention, no such pretreatment is required and further if the pretreatment regime disclosed in the Coté et al. were practiced using polyethylene hollow fibers rinsed with methanol and water, the result would be that the treated fibers would not be useful for oil-water separations. The oil would eventually permeate through the fiber along with the water thus negating the purpose of separation. Accordingly, it is clear that the Coté et al. system has been designed for non-oil based separations.

With respect to fiber selection, the same are preferably microporous with the average pore diameter of the pores typically in a range comprising, for example, 0.03 microns ($\mu$m) to about 5 microns ($\mu$m). The pore diameter will, of course, vary depending on the intended use for the fibers and therefore may exceed this range.

Suitable material for the hollow fibers can include, for example, polyolefins such as polyethylene, polypropylene, polybutene, polyisobutylene, polypentene, poly (4methylisopentene) and their halogen-substituted derivatives having at least one fluorine atom: polystyrene and a halogenated polystyrene having at least one fluorine atom: copolymers of ethylenically unsaturated hydrocarbons and/or halogen-substituted ethylenically unsaturated hydrocarbons having at least one fluorine atom, ethylenically unsaturated hydrocarbons and their halogen-substituted derivatives including ethylene, propylene, butene, isobutylene, pentene, hexene, monofluoroethylene, vinylidene fluoride, trifluoroethylene, tetrafluoroethylene, trifluorochloroethylene, hexafluoropropylene and the like; and blend polymers such as a combination of polyethylene with polypropylene, poly vinylidene fluoride, polytetrafluoroethylene or polystyrene; a combination of polypropylene with poly vinylidene fluoride or polytetrafluoroethylene and the like. Preferred examples of materials employable include, as a main component, polyethylene, a halogenated polyethylene having at least one fluorine atom, polypropylene, a halogenated polypropylene having at least one fluorine atom, or copolymers of two or three kinds of monomers selected from ethylene, propylene and tetrafluoroethylene. It is noted that where a plurality of components having different critical surface tensions are combined, the more the proportion of the component having a lower critical surface tension, the lower the critical surface tension of the entire polymer becomes.

In terms of apparatus for practicing the method of the present invention, an organic storage container and suction apparatus may be conveniently positioned on a platform with the arrangement of fibers suitably connected to the suction apparatus. The suction apparatus may comprise a suitable pump sufficient to induce a sufficient suction in the hollow fibers in order to draw oil therethrough for deposit into the storage container.

Where it is desirable to have a self-contained unit which additionally is self-propelled, the storage container may incorporate a water discharge outlet which further may include a forcibly exhausted water stream. The forcibly exhausted water stream may be used to propel the floating recovery system through, for example, an oil slick.

In addition to the foregoing, the apparatus may additionally conveniently include a receiver such that the apparatus can be remotely controlled. In this respect, the apparatus may include a radio receiver or other suitable electromagnetic means for detecting a signal from a remote location. Further still, the apparatus may be manually moved by any suitable means and further may include connection fixtures to permit the possibility of towing the arrangement.

The possibility for remote control is a convenient feature; it permits a user access to an oil, chemical or other contaminant spill area even where there are hazardous conditions, e.g. surface fires, toxic fumes, etc.

Land-based systems are also useful including, for example, industrial, commercial, residential, environmental solvent extraction inter alia.

A further object of one embodiment of the present invention is to provide a method of purifying oil contaminated with water in an oil-water mixture, comprising the steps of:

providing a plurality of individual hydrophobic microporous fibers, each fiber of the fibers having an exterior and a hollow interior;

inducing a negative pressure within each fiber of the fibers relative to the exterior of the fibers;

contacting, under negative pressure, the fibers with the mixture; and drawing the oil from the mixture through the fibers to provide a discrete purified oil phase free of water.

Conveniently, the technology set forth herein is well adapted to a panoply of industries including the food, drug, natural products, synthetic drug, perfume, petroleum, mining, metal processing, petrochemical, environmental remediation, water purification and analytical chemistry industries. As an example, the use of the method according to one embodiment of the invention is useful for dewatering edible oils, i.e. the palm, coconut, olive, peanut, canola and sunflower oils. In this regard, a further object of one embodiment of the present invention is to provide a method of separating at least one organic compound from an aqueous mixture having an aqueous phase and an organic phase, comprising the steps of:

providing a plurality of hollow hydrophobic microporous fibers;

maintaining a negative pressure in the fibers at a level sufficient to induce a negative pressure sufficient to draw the organic compound into the fibers, but insufficient to overcome the surface tension of the aqueous phase;

contacting the mixture with the fibers; and separating the organic phase from the mixture as a separate organic phase devoid of said aqueous phase.

The present technology also has utility in the fragrance industry. To this end, the method may be employed to dewater essential oils.

It will be appreciated by those skilled in the art that although there is discussion of the use of the arrangement for recovering oil, many immiscible organic substances either mixed with or floating on a water body may be recovered using the inventive concept in the present invention.

As indicated herein, the apparatus has been contemplated for numerous possible uses. In addition to the self-contained arrangements or flotation arrangements using partially land-based equipment, the present invention may be employed in a towing arrangement where the hollow fibers are towed behind a large floating vessel, e.g. a barge or other floating carrier vessel. In this manner, the arrangement effectively "self-cleans" the surface of the water as the vessel travels therealong.

Other arrangements clearly envisioned as being within the scope of the present invention include the use of the fibers for the purpose of lining a contaminated pond, such as a mine tailings pond. Further still, the arrangement may be totally submersed in a contaminated water body to assist in cleaning contaminated soil or a contaminated river sediment bed, lake bed, etc.

The fibers, when in a mat arrangement or bundle arrangement may be positioned in an area to be treated in a stacked arrangement comprising bundles of the fibers, mat arrangements, woven or non-woven mat arrangements or employing substrates for the purpose of supporting the fibers or any combination of the above arrangements.

Conveniently, the methodology allows the pressure of operation to be controlled. This facilitates easy optimization of the method for a given situation.

One of the particularly convenient advantages associated with the technology described herein can be realized when one is removing an organic material from aquifers, soils, etc. containing the organic materials and water, for example, from contaminated aquifers. By practicing the methodology described herein, it is possible to simply utilize a module containing the hollow fibers to remove the organic from the water, while leaving the water in situ. This clearly obviates the need to treat the water according to government standards, environmental standards, etc., which would be the case if the water had to be transported with the organic material. By simply using the methodology of the present invention, the handling requirements for the water can be completely avoided. This obviously has significant time saving and numerous other advantages. Incidental to very effectively removing the organic material, the methodology also facilitates particulate filtration.

Yet another object of one embodiment of the present invention is to provide a method of recovering an organic material from a soil or sediment containing said organic material, comprising the steps of:

provding a plurality of hydrophobic hollow fibers having micropores therein and each having opposed ends, each end being inaccessible to the soil or sediment, the fibers adapted for connection with a source of negative pressure for creating negative pressure in each fiber;

pretreating the soil or sediment to entrain the organic material to be removed in a mixture;

contacting the mixture containing entrained organic material with the fibers;

applying negative pressure to the fibers; and recovering the organic material from the mixture.

A further advantage to the system disclosed herein relates to the embodiment discussed above. In contaminated sediment or soil, the technology disclosed herein may be readily employed to recover organic material or detoxify sediment or soil contaminated with organic contaminants. In this situation, the soil or sediment may contain water and therefore would subscribe to an aqueous medium. By providing a mat or liner of the fibers discussed hereinabove and applying negative pressure thereto, the organic material may be removed from the sediment or soil provided sufficient liquid content is present. In the situation where the viscosity of the sediment is too high or the soil lacks sufficient water, then suitable other techniques may be employed to entrain or otherwise carry the organic material/organic aqueous mixture into contact with the fibers. This may be achieved by forcibly injecting a suitable diluent or percolating the same through the soil or sediment.

Where the sediment or soil contains organic, inorganic as well as metals, the pretreatment regimé may include the use of a chelating agent alone or in combination with compatible solvents. The composition of the diluent will depend on a specific application. Obvious variations will be appreciated by those skilled in the art.

Use of the fibers and the contemplated arrangements herein clearly can be employed in combination with contaminant booms or in combination with any other contaminant clean-up system. To this end, the hollow fibers in connection with a suction means may be positioned between conventional oleophilic mats which act to attract the oil thus enhancing the extraction efficiency of the oil from the water body. This would be effective in certain situations and the hollow fiber array would be useful to draw the oil out of the mat preventing saturation of the mats with oil.

Having thus generally described the invention, reference will now be made to the accompanying drawings illustrating preferred embodiments.

BRIEF DESCRIPTION OF THE DRAWINGS

Similar numerals denote similar elements throughout the figures.

DETAILED DESCRIPTION OF THE PREFERRED EMBODIMENTS

It has been found that maximum oil-water separation rates using the method as described in the Nohmi et al. patent, may be predicted using Poiseuille's formula. This formula is an expression for the volume of liquid per second (v) which flows through a capillary tube of length L having a radius R, under a pressure P, the viscosity of the liquid being $\eta$. P and V are directly proportional, i.e. P=KV where K is fixed for a tube given constant length, radius and liquid viscosity. This puts an absolute upper limit on flow rate per fibre or module before $H_2O$ breakthrough pressure ($\Delta P_{max}$) is reached. By supplying or forcing the feedstream to be separated to the outside of the fibers as claimed herein, the pressure drop across the module is much lower, thus, the phases can be readily isolated at much higher water and oil total feedstream rates. This is a distinct advantage over the prior art which failed to observe this difference in efficiency of shell side feed as opposed to lumen side feed incorporating hydrophobic fibers in the arrangements to be set forth herein.

Figure 1:
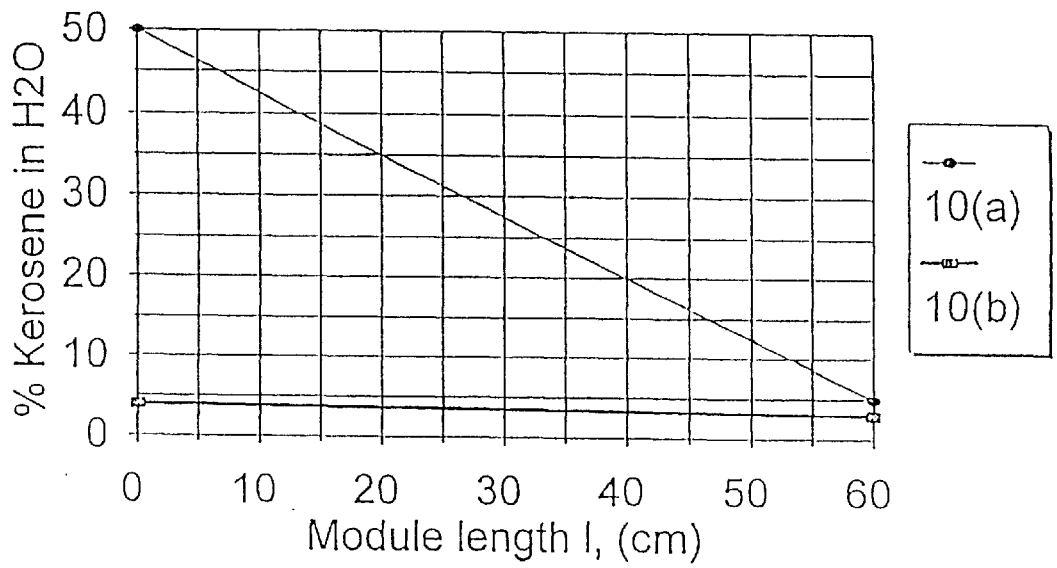
FIG. 1 is a graphical representation of the percentage of organic removed from a sample as a function of module length for a given pressure.
Figure 1A:
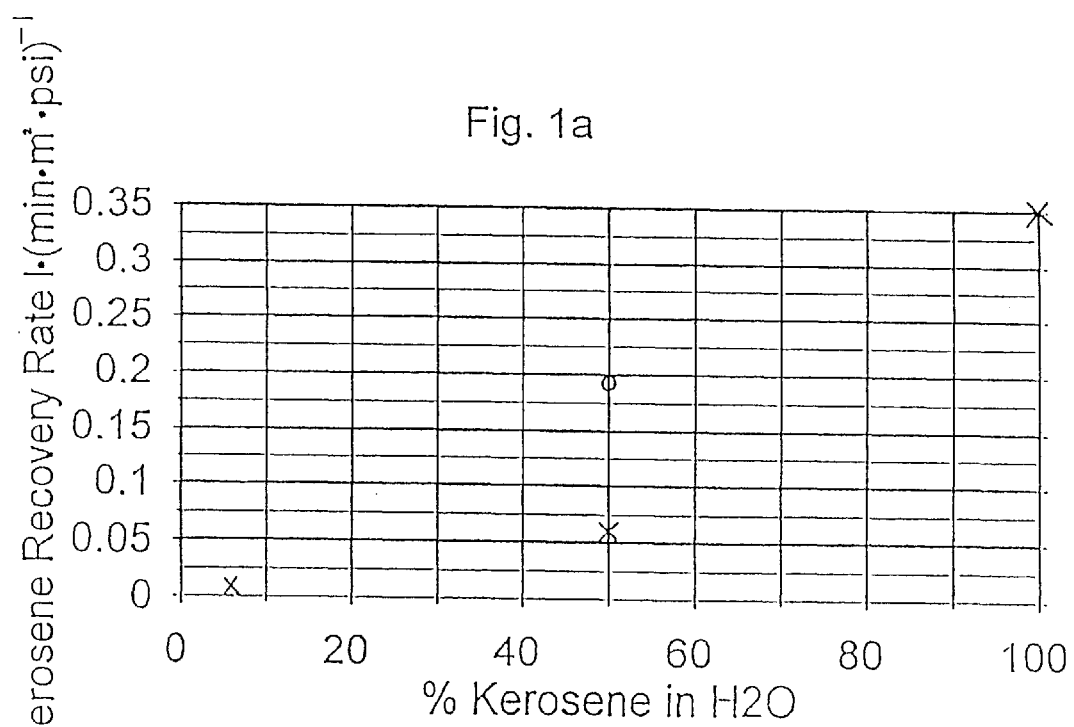
FIG. 1A illustrates kerosene recovery rates as a percentage of kerosene for Examples 9 and 10A through 10C.

In FIGS. 1 and 1A, graphical representations of the inherent limitations associated with practicing the methods in the prior art are depicted. Much greater detail will be set forth concerning this point in Example 10. As is clearly illustrated, the amount of organic, in this instance kerosene, present in the sample cannot practically be entirely, i.e. 100%, removed from a sample comprising a mixture of organic in an aqueous medium. This is clearly indicated by the asymptote which is slightly above zero and indicates that regardless of the pressure or length of the fiber or module, 100% pure phase oil removal can never be achieved using the prior art down-bore or lumen feed methods.

Figure 2:
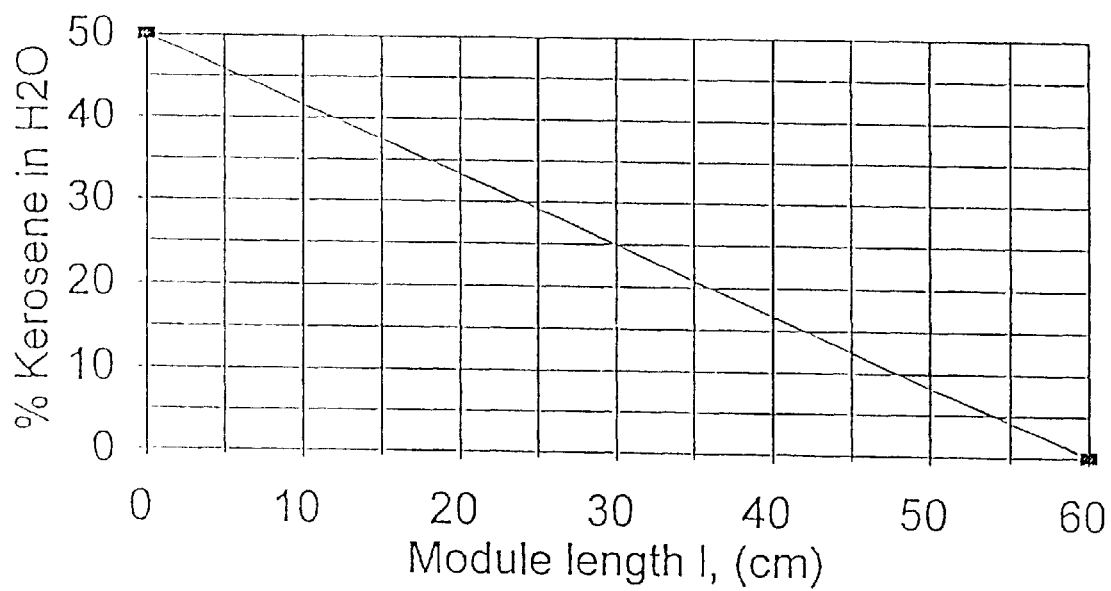
FIG. 2 depicts similar information as in FIG. 1, but for shell side operation.

To contrast this, FIG. 2 shows a graphical representation of the percentage of organic removed from a sample as a function of module length for the same conditions as that set forth in FIG. 1. It is clear that 100% organic removal, is achievable by introduction of a sample on the shell side of the fibers. With the present invention, this significant advance in organic recovery is achievable.

The success which has resulted by practicing the methodology of the invention set forth herein is believed to be the result of a combination of factors, these factors including:

i) development and application of the principles of fluid dynamics as applied to multi-phase flow;

ii) the recognition of efficiency of the polyolefin microporous hollow fibers for phase separation;

iii) the recognition of the effect of various physicochemical properties of oil versus, for example, water on microporous polyolefinic fibers; and vi) the presence of a pressure drop or pressure differential between the outside surface (shell side) of the fibers and the inside or lumen of the fibers which can be induced by any suitable means such that said differential is sufficient to separate the organic material from the aqueous medium, but insufficiently strong to pass the water through the micropores.

Although the concepts either individually or partly in combination have been previously addressed in the prior art, it is clear that the prior art has completely failed to link all of these concepts together in order to arrive at the significant advance that has been made in the present invention. By experimentation and a clear understanding of the above-mentioned concepts, standing alone and when taken in combination as well as the interrelation between these concepts, the results of the present invention have been achieved.

Figure 3:
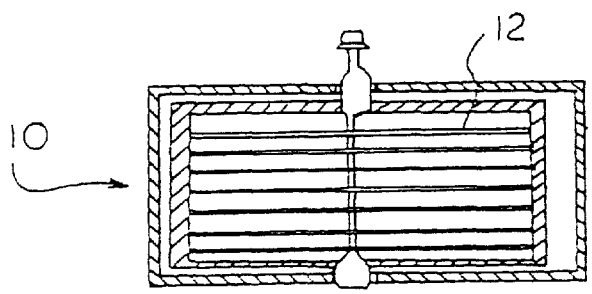
FIG. 3 is a top plan view of a mat according to one embodiment of the present invention.
Figure 4:
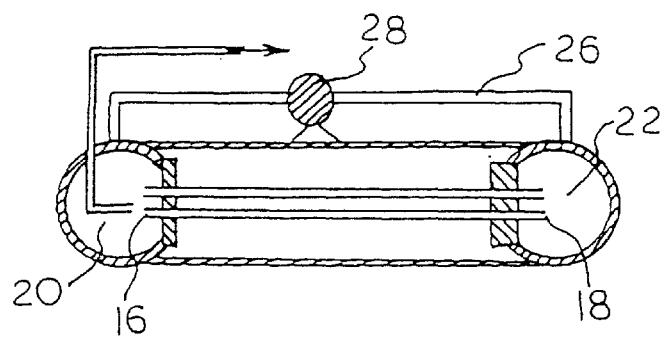
FIG. 4 is a cross-sectional view of the mat illustrated in FIG. 4.
Figure 5:
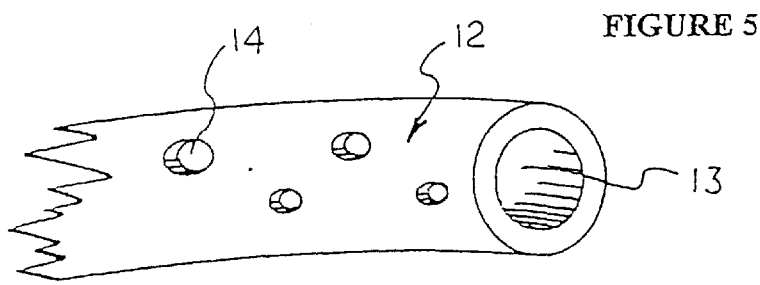
FIG. 5 is an enlarged view of a fiber incorporated in the present invention.

Referring initially to FIGS. 3, 4 and 5, shown is the apparatus according to a first embodiment of the present invention.

The mat, generally denoted by numeral 10 in FIG. 3, comprises a plurality of individual hollow fibers 12, each fiber 12 having a hollow interior or lumen 13. The fibers 12 further include a plurality of micropores 14 (shown in enlarged detail in FIGS. 6 and 7) extending from the outside of the fiber to the interior of the fiber 12 such that the micropores are in communication with the lumen 13. Generally speaking, the pore sizes of the micropores 14 will vary depending upon the material of which the fiber is made, the intended use for the fiber in terms of the contaminant to which it will be exposed among a host of other factors. As an example, the pores sizes can range from 0.03 microns ($\mu$m) to about 5 microns ($\mu$m) as a generally useful range. Broadly, the principle to be observed is that the micropores will be large enough to permit acceptable flux, but small enough to exclude water due to surface tension effects of the hydrophobic fiber.

The fibers may have an internal diameter from about 0.001 centimeters (cm) to about 5 centimeters (cm), with a preferred range of 0.005 centimeters (cm) to about 1 centimeter (cm) and most desirably from about 0.01 centimeters (cm) to 0.1 centimeters (cm) in the case of polypropylene fibers.

With respect to the individual fibers, it is preferred that the fibers comprise a hydrophobic material illustrated examples of which may include polyolefins such as polyethylene, polypropylene, polybutene, polyisobutylene, polypentene, poly(4-methylisopentene) and their halogen-substituted derivatives having at least one fluorine atom; polystyrene and a halogenated polystyrene having at least one fluorine atom: copolymers of ethylenically unsaturated hydrocarbons and/or halogen-substituted ethylenically unsaturated hydrocarbons having at least one fluorine atom, ethylenically unsaturated hydrocarbons and their halogen-substituted derivatives including ethylene, propylene, butene, isobutylene, pentene, hexene, monofluoroethylene, vinylidene fluoride, trifluoroethylene, tetrafluoroethylene, trifluorochloroethylene, hexafluoropropylene and the like: and blend polymers such as a combination of polyethylene with polypropylene, poly vinylidene fluoride, polytetrafluoroethylene or polystyrene; a combination of polypropylene with poly vinylidene fluoride or polytetrafluoroethylene and the like. Preferred examples of materials employable, as a main component, polyethylene, a halogenated polyethylene having at least one fluorine atom, polypropylene, a halogenated polypropylene having at least one fluorine atom; or copolymers of two or three kinds of monomers selected from ethylene, propylene and tetrafluoroethylene.

Figure 6:
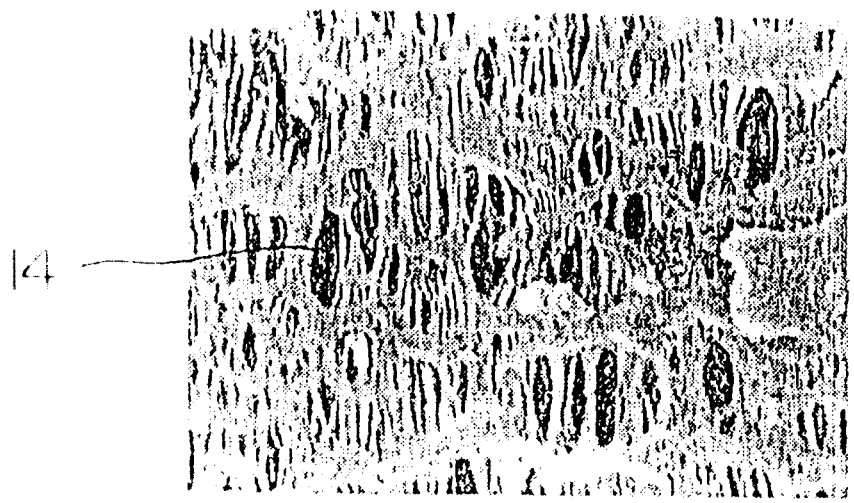
FIG. 6 is a magnified view of the fiber in FIG. 5 illustrating a first microporous morphology.
Figure 7:
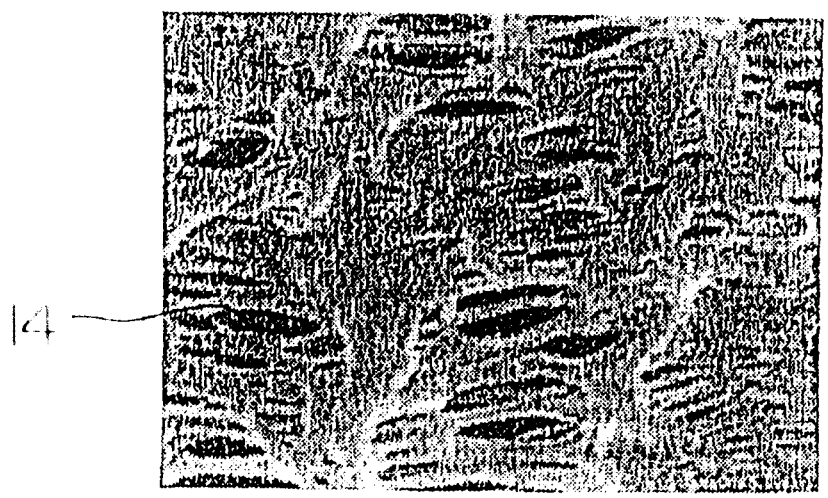
FIG. 7 is a magnified view of the fiber in FIG. 5 illustrating a second microporous morphology.

In the embodiments shown, the arrangement 10 includes a plurality of spaced apart parallel hydrophobic fibers, generally denoted by numeral 12. Although not illustrated in FIG. 3, it will be understood that the fibers include the micropores as illustrated in FIG. 6 and 7 and briefly discussed herein previously.

Each of the fibers 12 of which the floating mat arrangement is composed, according to this embodiment, includes an open end 16 and 18 as illustrated in FIG. 4. In this embodiment, the ends 16 and 18 are in communication with closed receptacles or containers 20 and 22, respectively. The ends of the fibers are associated with a respective container 20 or 22 such that the ends of the fibers are within the container and not in contact with the fluid, water body, etc. to be treated.

Conduits 26 extend from each of the containers 20 and 22 for communication with a negative pressure pump 28, which serves as one possible form of introducing suction into the fibers 12. In view of the fact that the containers 20 and 22 are sealed, the net suction effect created by pump 28 is experienced by each of the fibers 12 of which the mat structure is made.

In operation, when the mat 10 is positioned within a water body for the purpose of removing a contaminant or several contaminants, the negative pressure pump 28 is actuated which induces a suction effect in the individual hollow fibers 12. As the fibers are in communication with the contaminant to be removed, the material drawn into the fibers 12 via the micropores 14 is eventually drawn into either or both containers 20 or 22. The density of the arrangement 10 will be selected to float in the contaminant to be collected in order that maximum possible surface contact of the individual fibers with the contaminant is achieved.

Once the material to be collected is collected in containers 20 and 22, the same may be stored therein or subsequently transported to another location. This aspect will be discussed hereinafter.

Figure 8:
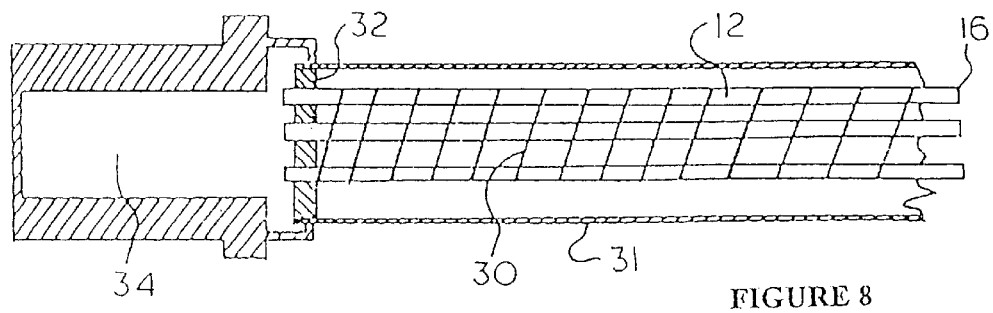
FIG. 8 is an alternate embodiment of the present invention.

With reference to FIG. 8, shown is an alternate embodiment of the present invention. In this embodiment, the mat 10 includes a plurality of spaced apart longitudinally arranged hollow fibers 12, each having a free end 16. The free ends 16 are closed and in this respect, the fibers employed in this embodiment are "single ended". This prevents the entry of water into the lumen which would otherwise occur if the fibers were open at end 16. In this arrangement, there is additionally included a plurality of laterally oriented members 30. Members 30 may be employed to impart additional structural integrity to the fiber arrangement or function as a coalescence enhancer, etc. Further still, the members 30 may comprise similar fibers as fibers 12. In each of the longitudinally oriented fibers 12, the opposed ends 18 are open and sealingly engaged by seal 32, i.e. potting, which seal is connected to a source of negative pressure indicated by numeral 34. A rigid open ended mesh 31 may be employed to protect the fiber or fibers 12.

Figure 9:
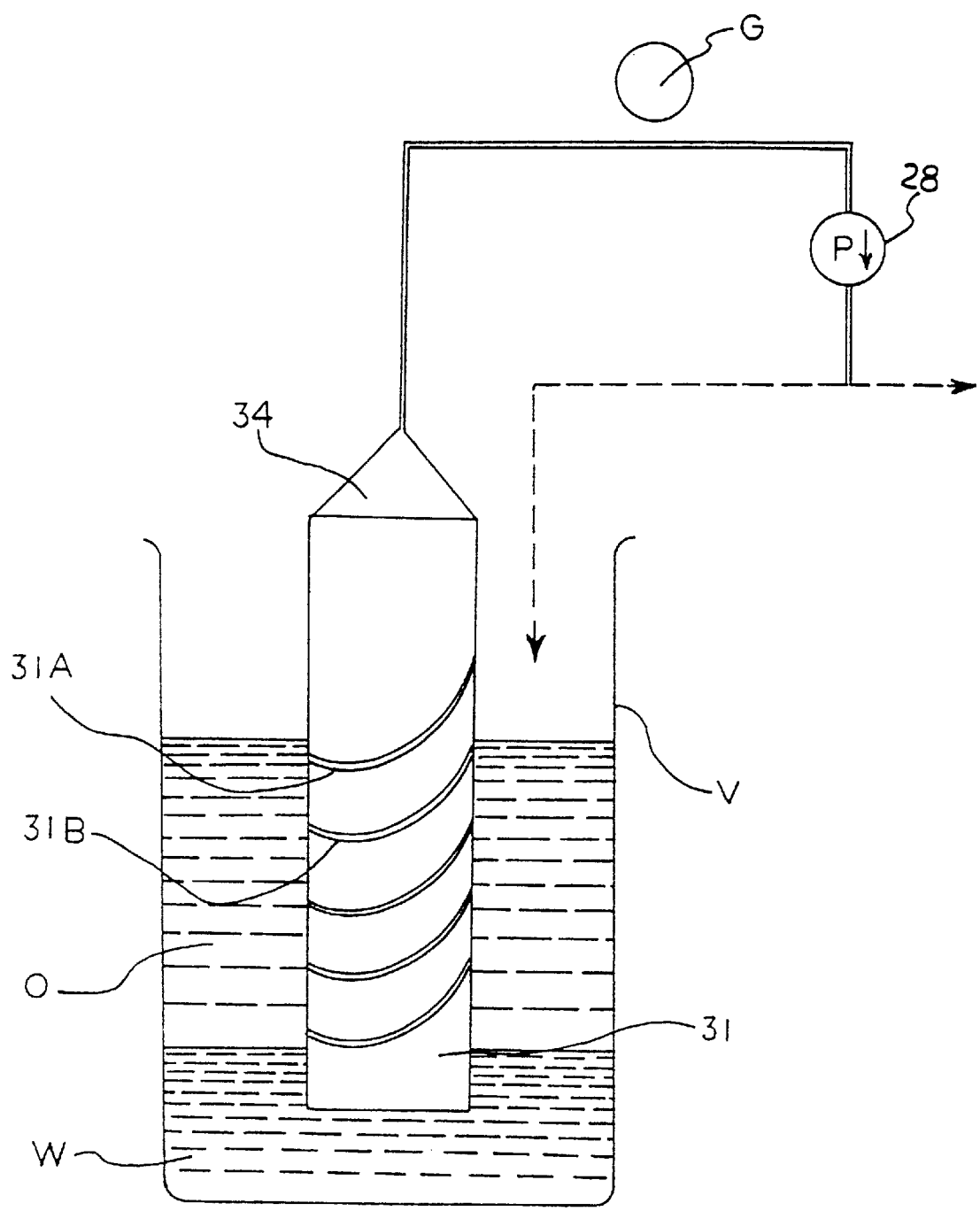
FIG. 9 is a schematic illustration of a further alternate embodiment of the present invention.

FIG. 9 illustrates a further alternate embodiment in schematic form. In this embodiment, the casing 31 contains a plurality of hollow fibers (not shown). A similar seal 32 communicates with vacuum source 34 (seal 32 not being shown in this illustration). At the opposite end of the vacuum connection, the casing 31 is open in contact with the fluids. Slots 31A and 31B enhance contact of the fluids with the fibers disposed in casing 31 if additional extraction of water phase contaminants is needed. In this embodiment, O represents an organic phase and W represents a water phase. In the illustration, the overall unit is connected to a Negative Pressure Suction Head (NPSH) pump 28. This pump provides a negative pressure to draw the organic through the apertures 31A and 31B which is transmitted through the pump. The pump 28 can return the organic material to the vessel V or alternatively, to a separate collection system shown in chain line. The pressure gauge G may be provided to monitor the pressure in the system.

Figure 10:
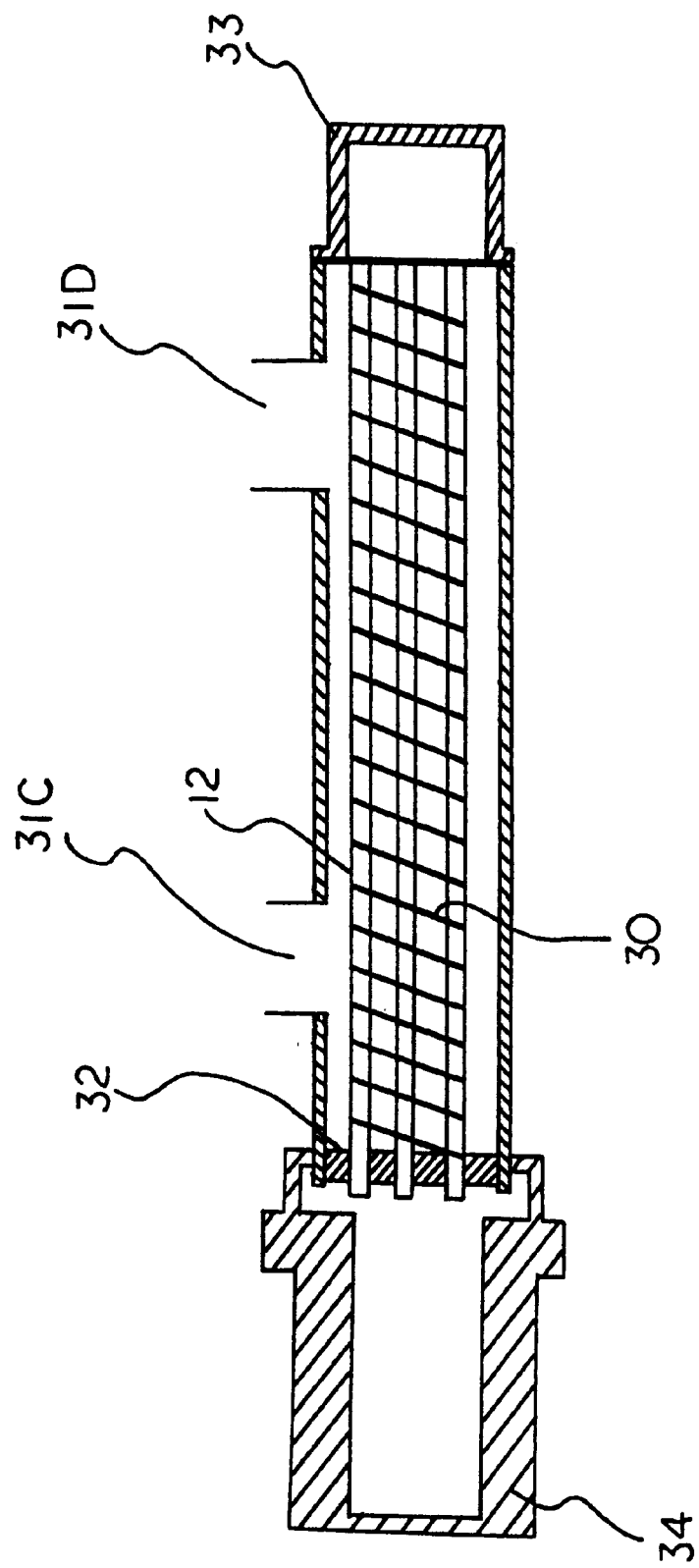
FIG. 10 is a cross-sectional view of a further embodiment of the present invention.

FIG. 10 shows a further alternate embodiment of the arrangements shown in FIGS. 8 and 9. In this embodiment, both ends of the fibers are sealed by seals 32, as illustrated. Accordingly, access to the fibers is achieved by providing a side port feed inlet 31C for transmitting a mixture of the organic and the aqueous phase and discharge port 31D for discharging the aqueous phase. As has been discussed herein previously, the organic material collected via the fibers can be discharged through a vacuum source (not shown in this embodiment) by any suitable means.

Figure 11:
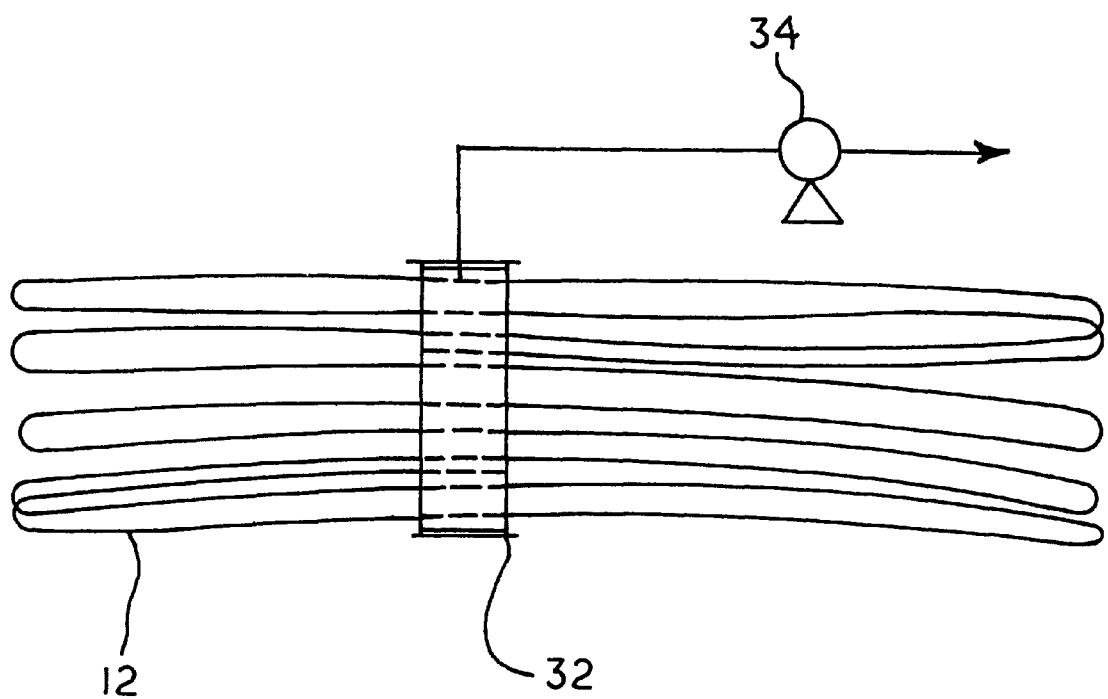
FIG. 11 is a schematic illustration of still a further embodiment of the present invention.
Figure 14:
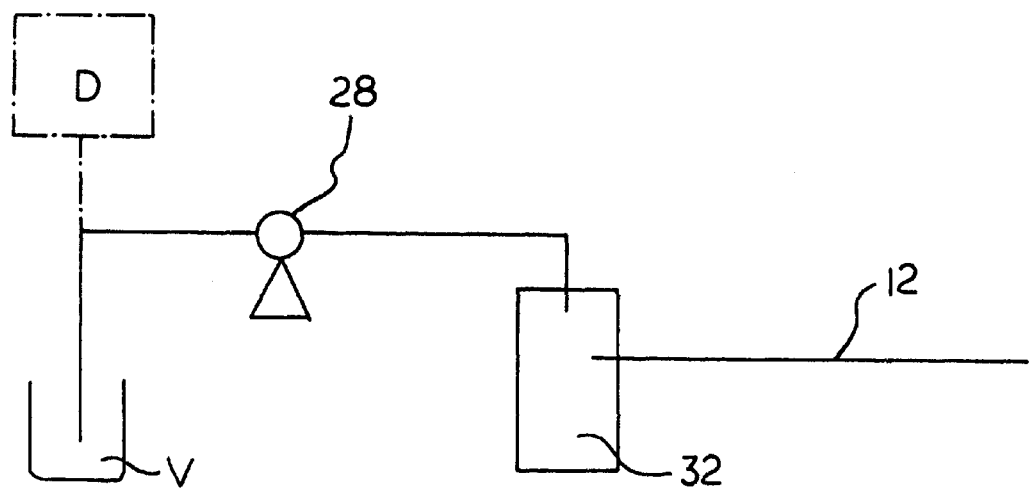
FIG. 14 is a schematic illustration of a further embodiment of the present invention.

As a further possible arrangement, it will be understood that the hollow fibers may be simply looped back to the seal 32, thus avoiding the need to provide a closed end on the ends 16 of the fibers 12. To this end, FIG. 11 generally sets forth one possible embodiment according to this concept. As is illustrated, the arrangement could be made of a series of individual fibers or simply have one fiber continuously looped through a seal 32 (for example a tube sheet) and a seal 32 connected to a source of negative pressure 34. Collected material could be removed from the pressure source 34 by any of the means discussed herein previously. With suitable size reduction, this feature may be employed to fabricate an in-line fuel filter for filtering the water from a fuel. Other suitable examples will be readily apparent to those skilled in the art.

Figure 12:
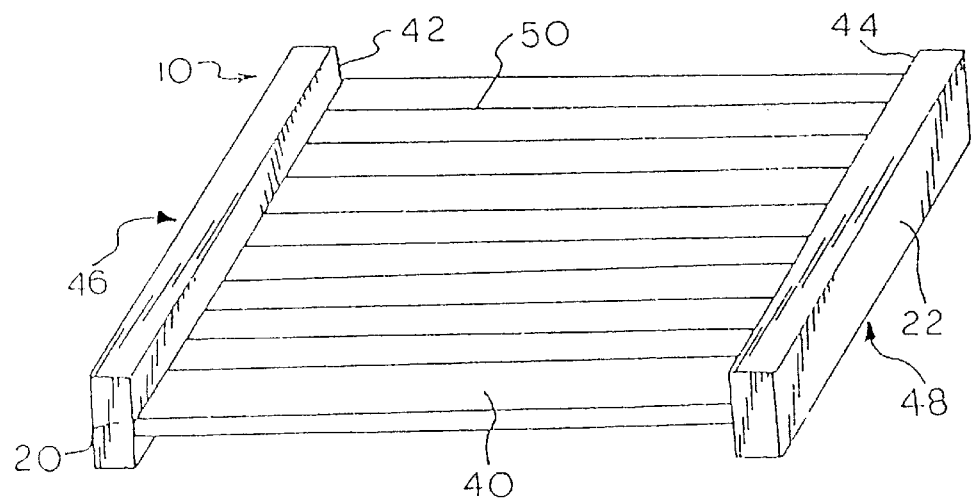
FIG. 12 is a perspective view of a still further embodiment of the present invention.

Referring now to FIG. 12, shown is a further embodiment of the present invention. In the embodiment shown, the mat 10 is composed of a plurality of bundles of fibers, the bundles being generally denoted by numeral 40. Similar to previous embodiments, the individual bundles, which bundles are composed of a plurality of individual fibers 12, include opposed ends 42,44 which are sealingly engaged with collection chambers 46,48 with a sealing compound, gasket or other such sealing arrangement generally denoted by numeral 50.

As set forth herein previously, the collection chambers 46,48 may be connected to a source of negative pressure in order to draw the contaminant into the micropores 14 and subsequently through lumen 13 of the fibers 12.

Figure 13:
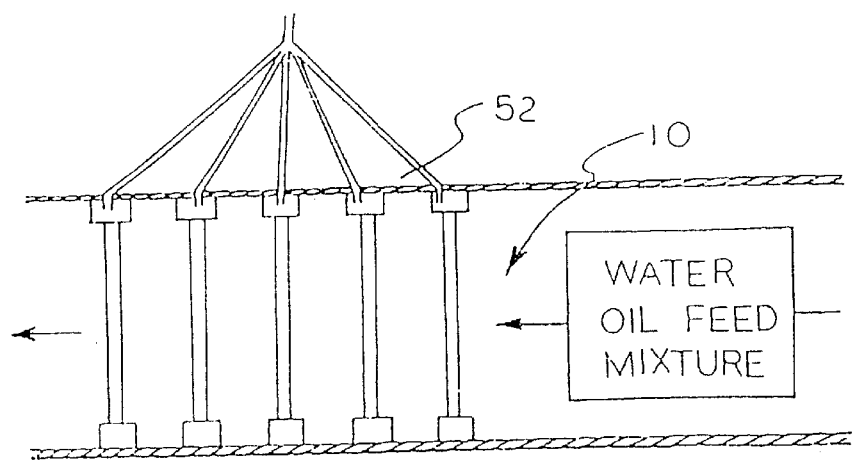
FIG. 13 is a top plan view of a further embodiment of the present invention.

FIG. 13 illustrates a plurality of the units as illustrated in FIGS. 8, 9 or 12 positioned in a spaced apart sequential arrangement. In the embodiment shown, all of the individual units include a common connection to suction means, the suction means being generally denoted by numeral 52. The common connection 52 may occupy either or both sides of the arrangement, depending on the arrangement employed.

As a further alternative to the embodiments illustrated in FIGS. 12 and 13, it will be understood that the bundles 40 of fibers 12 as discussed in reference to FIG. 12, could easily be replaced by single fiber 12 depending upon the intended use of the arrangement.

FIG. 14 illustrates a variation on the system where only a single fiber 12 is employed. Fiber 12, in order to have a sufficient vacuum therein, obviously will have a closed end and the opposed end will be connected to a seal 32 as in the previous embodiments. The seal 32 will be connected to a pump 28 and any collected organic may be deposited into a vessel V i.e. a sample vial, test tube or other suitable retention apparatus. The pump 28, where required, could simply be battery operated to facilitate portability. By providing this arrangement, the same could easily be employed in a situation where one needs to monitor the effluent, for example, factory discharge, chemical plant discharge, etc. This arrangement could simply be disposed adjacent an effluent outlet and by virtue of the methodology of the invention, any organic material present in the effluent would be immediately drawn into the fiber via the micropores and collected in vessel V. As a further option, the vessel may simply be replaced by some form of a detection apparatus shown in chain line and represented by D. Various organic detectors are well known in the art and it will be readily appreciated by those skilled, which detectors would form suitable types. This type of arrangement could be readily employed in a portable testing kit. This would, of course, readily facilitate on-site sampling of effluent in order to determine whether the effluent subscribes to environmental regulations, etc.

Turning to FIG. 15, a further variation on the apparatus shown in FIGS. 12, 13 and 14 is shown. In this embodiment, the fiber or fibers represented by numeral 12 are either bent, deformed or sealingly engaged with a source of gas flow, if desirable, in order to keep one end of the fiber out of possible contact with an aqueous mixture (not shown). To this end, the fiber or fibers 12 are open ended at one end and sealed by seal 32 at the opposite end as discussed herein previously. This arrangement would be useful in, for example, a floating arrangement to monitor, for example, oil tank or waterways, shipyards or any other area where the potential is high for contaminants to inadvertently become spilled in a water body.

In operation, since the end of the fiber or fibers 12 is open, there is an increasingly negative pressure within the fibers relative to their outside as proximity to vacuum source increases, such vacuum as registers on gauge G being constant at constant pump rates, since the flow is air (or other gas) in the absence of oil or other organic which will enter the lumen due to the partial vacuum induced by pump 28.

In the event that the fiber or fibers 12 come in contact with an organic material, this immediately causes a difference in the pressure due to a sudden increase in the presence of the liquid organic material versus the air. By making use of the methodology of the present invention, this sudden change in pressure results in an early warning of spills of organic materials or other such situations. It will be appreciated that any number of ways could be employed to maintain the open end of the fiber or fibers out of contact with the liquid within which the arrangement would be disposed. To this end, the fiber ends may be linked to any type of a flotation system (not shown) or may be held by buoys, balloons, etc. (all of which are not shown in this figure).

Figure 16:
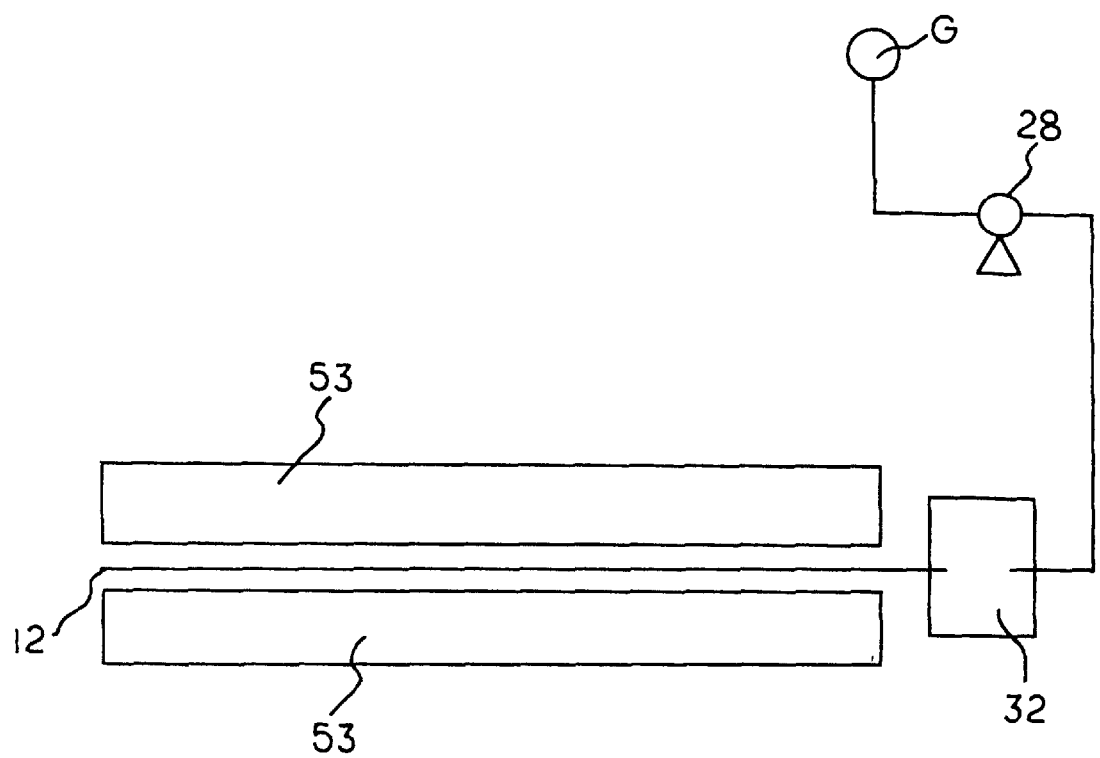
FIG. 16 is a schematic illustration of yet another embodiment of the present invention.

With reference to FIG. 16, shown is yet another variation on the previously discussed embodiments. In the embodiment shown, a single fiber may be employed or many fibers 12, which may be positioned between mats or batting 53, composed of material similar to the batting discussed in U.S. Pat. Nos. 3,715,036 and 3,554,378. To this end, the batting 53 can attract the organic material, i.e. oil, etc., directly adjacent the fibers 12. This further enhances the extraction of the organic material in view of the even greater degree of contact provided by the batting 53. As will readily be appreciated by those skilled in the art, the mixture of the organic in the water often results in the formation of drops or globules of oil. By providing the batting in combination with the hollow fiber, the result is that the batting acts as a coalescing medium and wicking medium to carry the oil to the hollow fiber. This arrangement, is significant in that the hollow fiber may be combined with existing batting in a single unit but still result in shell side feed of the oil to the hollow fibers. In the prior art, this concept has not been recognized.

Figure 17:
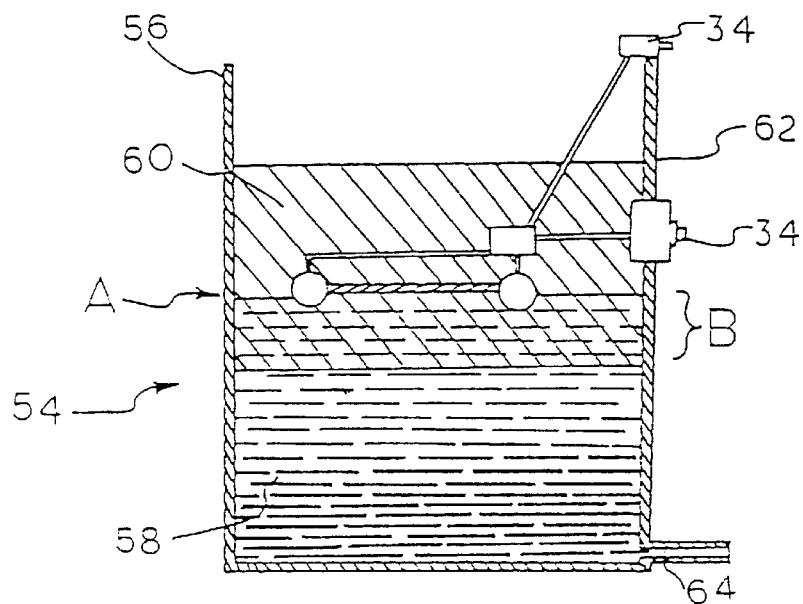
FIG. 17 is a further embodiment of the present invention illustrating the mat as positioned within a separating vessel.

In respect of FIG. 17, there is schematically illustrated an example of an oil and water mixture phase separation unit, generally denoted by numeral 54. In the embodiment, numeral 56 represents a holding vessel into which may be pumped a mixture of water and a contaminant to be separated. The mixture may be introduced into the vessel 56 at A.

In the illustration, numeral 58 represents the water, while numeral 60 represents a contaminant or contaminants floating on the surface of the water 58. This arrangement may be found useful for immiscible contaminants which are dispersed droplets in the mixture and which require settling time in order for distinct phases to develop as illustrated. The embodiment is particularly useful for a situation where the oil droplet size and/or concentration is too small to allow efficient utilization of other embodiments shown and added droplet coalescence time is required (as in the case of ultra fine oil droplets produced by ban oil/water mixtures subjected to high shear or turbulence). In the example, the mat 10, as illustrated in FIG. 4, may be employed within the vessel 56. As is clearly illustrated, the mat assembly is submerged and accordingly floating within the contaminant 60 or in the mixed phase region indicated by arrow B in the Figure. The pump 34 may be positioned directly on the mat as set forth herein previously with respect to FIG. 4 or, in the alternative, may be positioned at a suitable location on vessel 56 and in communication with mat 10 via a suitable conduit indicated by numeral 62. As is evident from this embodiment, the pump 34 may be positioned at a suitable location which permits easy transportation of the collected material from within the collection areas 20, 22 of mat 10 to a second location. The contaminant-free water may be removed from vessel 56 by outlet 64 and subsequently reintroduced into the water body from which it came or reintroduced into vessel 56 for further treatments or, alternatively, may be passed onto further purification equipment (not shown).

Figure 18:
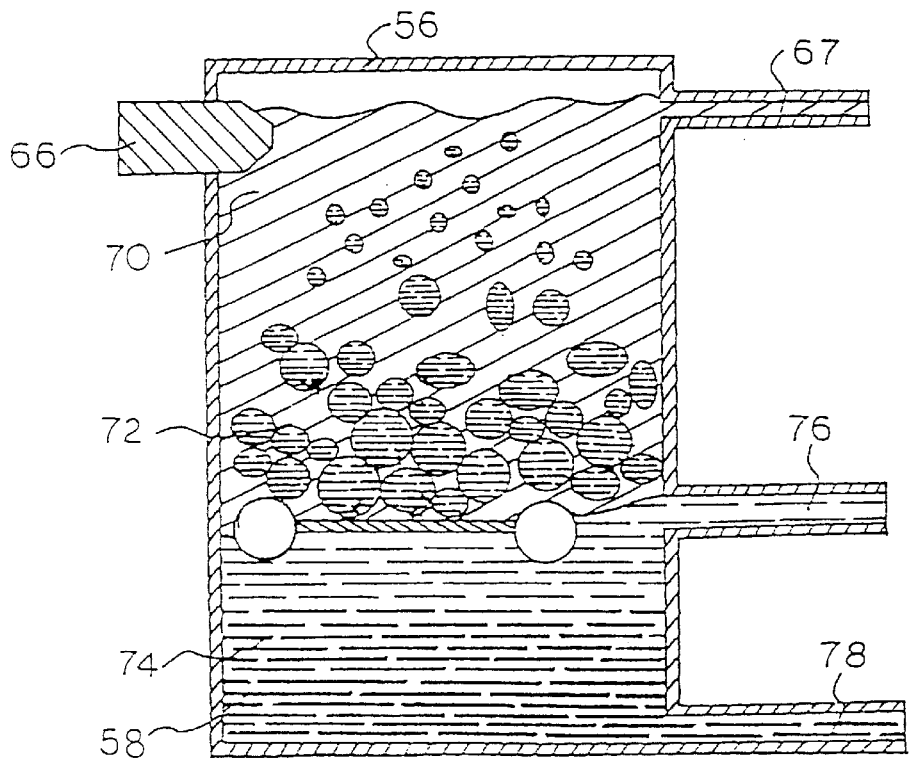
FIG. 18 is yet another embodiment of the present invention.

In FIG. 18, shown is yet a further embodiment of the present invention, shown in schematic form. In this embodiment, the arrangement may include a nozzle 66 extending inwardly and in communication with vessel 56. Vessel 56 further includes an inlet 67 which provides for extractant organic recycle, make-up, or level control. Also, inlet 67 permits access to the vessel 56 such that the composition of layer 70 may be selectively altered. The nozzle is useful for introducing a contaminant/water/metal composition into vessel 56 for separation. Having a feed containing the above-mentioned components, the result is generally that the materials stratify into layers 70,72 and 74. Layer 70 generally contains the organic phase, layer 72 contains a mixture of phases, water, coalescents, etc. and layer 74 essentially comprises water. This is an example of layer separation where the organics, extractants, etc. are less dense than water. It will be readily appreciated by those skilled in the art that where the organics, contaminants, etc. have a greater density of water, that the order of the stratification will vary in accordance with the difference in density.

An outlet 76 on vessel 56 directly adjacent the mat 10 provides the extraction of the organic layer together with chelated metal compounds and/or free metals and chelant. Outlet 78 provides for the discharge of substantially pure water devoid of the metal chelant, coordinated compounds or organics.

As will be appreciated, simultaneous, sequential or selective removal of desired components may be removed from vessel 56. Many of the other embodiments may also be used for metal extraction purposes. The apparatus of FIG. 18 may also be useful for increasing extraction of ultra fine oil droplets from water by "atomization" of the emulsion into very fine droplets causing coalescence with and/or extraction of oil into organic layer 70.

Figure 19:
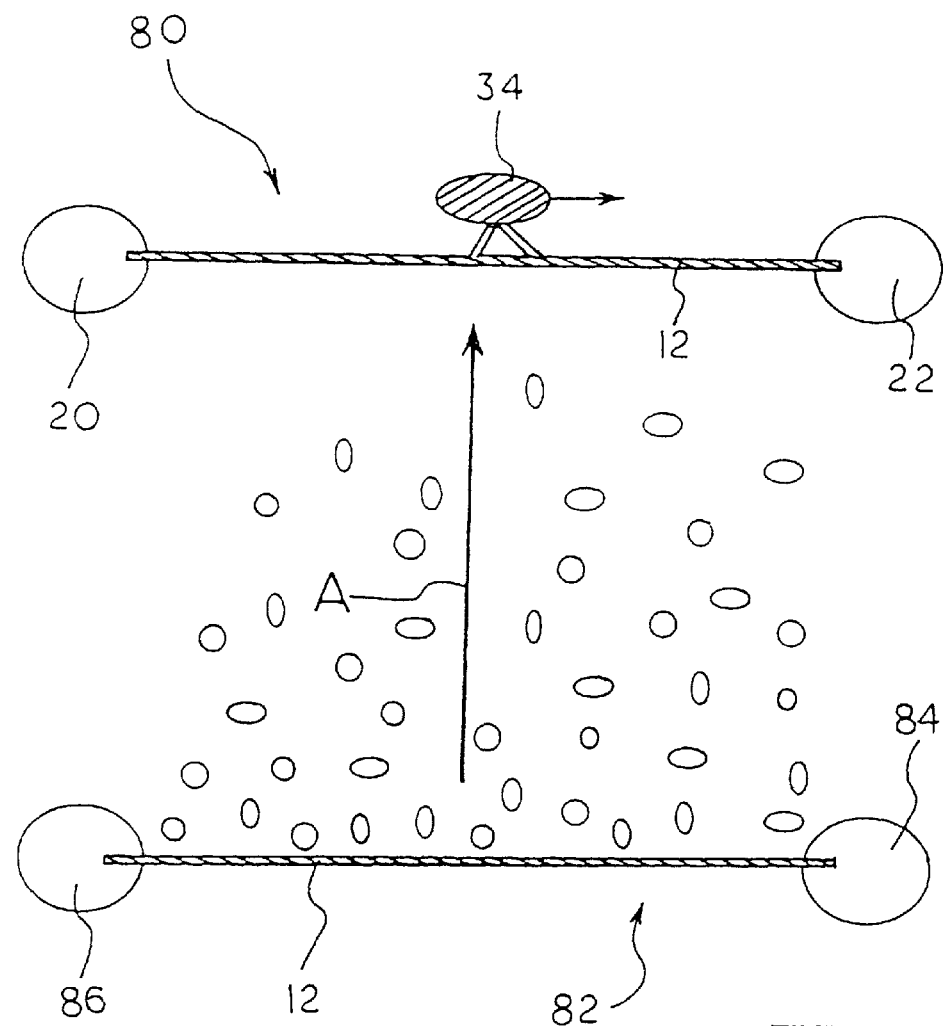
FIG. 19 is still a further alternate embodiment of the present invention.

Shown in FIG. 19 is a further embodiment of a solvent extraction system contemplated by the present invention. The arrangement, generally denoted by numeral 80, is useful for solvent extraction of a soluble species including, for example, organics and metal inorganics. In the arrangement shown, the system includes a first mat arrangement 82 composed of the fibers as set forth herein previously. The fibers 12 communicate at their terminal ends with a first extractant reservoir 84, adapted to carry a suitable extractant, which may be either forced through the fibers or diffuse naturally. Where the extractant is to be forced through the fibers 12, a suitable positive pressure pump or other means for forcing the fluid through the fibers will be employed (not shown in FIG. 19). The second reservoir 86 may be employed to recover unused extractant.

As the dispersed extractant flows through the body to be treated as indicated by arrow A in FIG. 19, the extract may be recovered by the uppermost mat arrangement and collected in reservoirs 20 and 22, the mat arrangement 82 may be substituted with any suitable means for dispersing an extractant, etc. into the body of material to be treated. Suitable arrangements will be readily apparent to those skilled in the art. Examples include simple perforated tubes or nozzle arrangements. Further still, there may be employed an external source of the extractant, etc. which is delivered to the mat arrangement 82.

By providing an outlet 76 and further in view of the fact that the mat 10 composed of the fibers permits removal of organic contaminants as well as various metals, the invention clearly has utility in the mining art since the arrangement can provide for recovered metal values which would otherwise be lost or irrecoverable.

It will be readily appreciated by those skilled in the art that the present invention is clearly applicable to removing soluble contaminants from a water body containing contaminants dissolved therein. It is clearly within the purview of the present invention to apply suitable treatments, appreciated by those skilled in the art, for the purpose of precipitating an aqueous phase from another phase. In this manner, once the phases are separated, the fiber mat or bundle arrangement or fiber array according to the present invention may be employed for the purpose of separating one phase from the other.

Where the contaminant comprises a petroleum or any other hydrocarbon floating on the surface of a water body from, for example, an oil tanker spill, one or several of the mats may be employed for recovering the oil from the surface and thus purifying the water. Depending on the size of the spill, an arrangement such as that indicated in FIG. 13 may be desirable for cleaning up the spill. Where temperature increases the viscosity of the oil or the contaminant is of a highly viscous nature, the viscous contaminant may be diluted with a suitable diluent, e.g. a liquid hydrocarbon or any other suitable viscosity modifier. Further, the viscous contaminant may be heated to reduce its viscosity, if practical. In this manner, the herein described units containing the microporous hollow fibers can readily function in a variety of environments. As discussed herein previously, where the material to be treated contains metals, a suitable pretreatment regime may be employed to add a chelant or to coordinate the metal materials and render them insoluble and in the instance where the material includes insoluble particulates, i.e. sand, etc., it will be readily understood that the pretreatment regime may include filtering, centrifuging, chelant addition, freezing, cooling or any combination of these or those discussed hereinafter. The pretreatment regime will, of course, depend on the nature of the material to be treated according to the methodology of the present invention. In applications where water-free fuel or oil is critical (such as that required in the aircraft industry or in emergency generators), a provision is made for the use of any variety of the known dehydration techniques as adjuncts to the invention. Examples of suitable techniques include gravity trapping, absorption, etc.

In some instances, an oil-water mixture may require heating prior to introduction into contact with the fibers. The solubility of water in oil may decrease with temperature so that as the oil cools, water droplets may form. The provision of auxiliary dehydration would readily eliminate this inconvenience.

Figure 20:
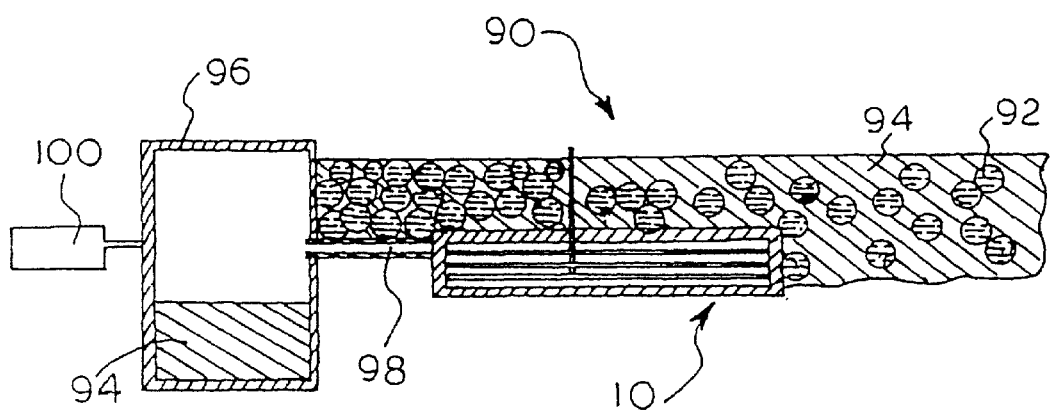
FIG. 20 is a schematic illustration of the invention as employed with a containment boom.

Turning now to FIG. 20, shown is a further embodiment of the present invention in which an array of the fibers 12 are used in conjunction with a containment boom conventionally employed in oil clean-up. The overall arrangement is globally denoted by numeral 90. In the example, a body of water 92 is contaminated with oil 94 floating thereon. The arrangement 10, which may comprise any of the previously mentioned embodiments, such as a bundled arrangement, mat arrangement, etc. is positioned in the oil 94 for recovery of the same. Recovered oil is collected in a boom 96, a section of which is illustrated in the schematic drawing. Communication between the mat 10 and containment boom 96 is achieved via a conduit 98. Numeral 100 represents a source of suction connected to the containment boom and accordingly to mat 10 via conduit 98. This is an optional element and would not be necessary if the arrangement 10 included a source of suction.

Finally, with respect to the choice of material of which the fibers and/or bundles may be composed, it will be appreciated by those skilled in the art that the fiber composition will depend upon the type of contaminant to be collected. In this manner, the fiber material will be selected such that the contaminant does not deleteriously alter the properties of the fiber with respect to lumen size, internal diameter, external diameter, pore size or surface characteristics such as hydrophobicity of the fiber and/or pore size.

Having thus described the invention, reference will now be made to examples which set forth the data generated as a result of the use of the methodology set forth herein. The examples demonstrate the efficacy of the method for a variety of substances and oils having different physicochemical properties.

EXAMPLE 1

| Floating Rod Assembly (4 rods containing fibers, 2 liters of diesel fuel in 98 liters of water) | | | | |
|---|---|---|---|---|
| Temperature (°) | Time (min.) | Vacuum (kPa) | Diesel Recovered (mL) | Water Recovered (mL) |
| 16 | 0 | 0 | 0 | 0 |
| 16 | 2 | 60 | 580 | 0 |
| 16 | 5 | 71 | 1320 | 0 |
| 16 | 10 | 80 | 1770 | 0 |
| 16 | 15 | 83 | 1880 | 0 |
| 16 | 20 | 83 | 1940 | 0 |
| 16 | 25 | 83 | 1960 | 0 |
| 16 | 30 | 83 | 1970 | 0 |

By making use of the apparatus similar to that illustration in FIG. 12, nearly all of the diesel was recovered from the initial mixture and was devoid of any observable free-phase water.

| Fiber Data (for Examples 2, 3, 4) | |
|---|---|
| Inside Diameter | 270 µm |
| Outside Diameter | 374 µm |
| Fiber Outside Surface Area | 0.14 m$^2$ |
| Nominal Average Pore Diameter | 0.2 µm |
| Porosity | 73 volume percent (73 vol %) |

EXAMPLE 2

Tar Sand Organic Extract Recovery

A mixture of kerosene (100.81 grams), water (116.15 grams) and tar sand (27.93 grams—approximately 20% organic content) was mixed at 50° C. and the extracted sand settled and was removed. The resultant mixed phase liquid was fed to the module set forth in FIG. 10 on the shell side at inlet port 31C. A pressure of −5 psi NPSH at 34 in FIG. 10 was applied. This resulted in the recovery of 100 mlmin$^{-1}$ of kerosene and tar extract which was substantially devoid of free phase water as the collected permeate. The water remained in the shell of the module.

EXAMPLE 3

Crude Oil Dehydration

Using the same module as that for Example 2, 150 ml of 22 API (American Petroleum Index) crude oil and 100 ml of water were vigorously stirred and aliquot was fed to the shell side of the module. Under −5 psi NPSH, the result was the recovery of dry oil at a rate of 3.3 mlmin$^{-1}$. The experiment was conducted at 30° C.

EXAMPLE 4

Dehydration of Vegetable Oil

In this example, 70 ml of canola oil was mixed with 30 ml of water at 50° C. This mixture was fed to the shell side of the module. At 30° C. and −14 psi NPSH, 14 mlmin$^{-1}$ of dry oil was recovered.

EXAMPLE 5

Solvent Extraction

In this example, organic recovery rates are expressed as l (min·m$^2$·psi)$^{-1}$η where, l=liters m$^2$=fiber outside area psi is the net pump suction head pressure η is the viscosity of the organic/metal·chelant complex in centipoise (cP).

Laboratory measurements using different polyethylene fibers gave approximate recovery rates of up to 3 or more l (min·m$^2$·psi)$^{-1}$ cp or 50 m$^3$ (day·14 psi·m$^2$)$^{-1}$ for an organic liquid of η=1 cp.

In the example, the following chelants were used:

→DEHPA (diethylhexyl phosphoric acid)

→LIX84® of Henkel Corp

→LIX984® of Henkel Corp

The chelants were dissolved in varying percentages of kerosene.

The metals removed included iron, nickel, copper and zinc at various efficiencies from 40% to 100% depending on reaction conditions.

EXAMPLE 6

Conventional Fuel Recovery

In this example, the utility of the present invention is further demonstrated by making use of the technology to dehydrate or essentially render anhydrous conventional fuels. In this manner, the invention can be applied as a fuel filter to filter water from existing gasoline, kerosene, etc.

The apparatus employed to generate the data for this example is shown in FIG. 9.

The details concerning the apparatus include the following:

| Fiber Data | |
|---|---|
| Inside Diameter | 365 μm |
| Outside Diameter | 545 μm |
| Fiber Outside Surface Area | 0.135 m$^2$ |
| Nominal Average Pore Diameter | 0.2 μm |
| Porosity | 72 volume percent (72 vol %) |
| Slotted PVC case | 1" outside diameter 4.5" in length |

Flow Rate 400 mlmin$^{-1}$

| | Recovery Results | |
|---|---|---|
| Organic Compound | Pressure PSI | Recovery Rate l (min · min$^2$ · psi)$^{-1}$ |
| Hexane | <−1.0 | 3.37 |
| Gasoline | −1.9 | 1.56 |
| Diesel #1 | −3 | 0.99 |

EXAMPLE 7

Free Phase Oil Detection

Figure 15:
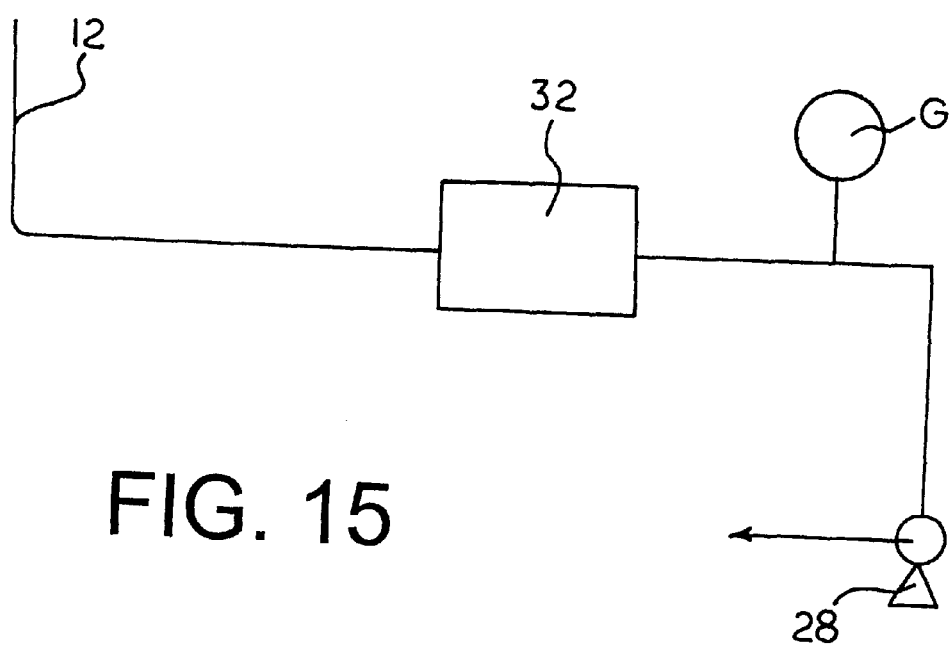
FIG. 15 is a schematic illustration of yet another embodiment of the present invention or could be sealingly engaged with an alternate source of gas flow if required.

In this example, the methodology was employed to determine the function of the fibers as simple organic detectors. The apparatus employed for this example is illustrated in FIG. 15. As indicated in the discussion with respect to FIG. 15, the arrangement includes at least one fiber 12, one end of which is connected to a potted seal 32, discussed previously, capable of communication with a vacuum source, the latter denoted by numeral 28 in the figure. At the opposed end of the fiber, the same was open as opposed to being sealed. In this manner, the suction applied to the fiber was measured to be a constant of −2.5 psi. The pump in this example was selected to be peristaltic. By the provision of an open ended fiber, in the absence of any material being within the lumen of the fiber, the pressure should remain constant. This was, in fact, the case and the pressure gauge G indicated −2.5 psi. It was believed that if only air were drawn into the lumen, the pressure would remain constant, whereas if free phase organic were present, i.e. oil, in a sample (such as that which would be encountered if the apparatus were set on a water body), the pressure should automatically change from the constant to a new value. In an effort to confirm these beliefs, the addition of free-phase kerosene feed (approximately 4 volume percent oil) to the shell side of the fiber 12, resulted in immediate observable change on vacuum gauge G. There was an immediate increase (approximately 5 seconds) as soon as the kerosene entered the fibers.

EXAMPLE 8

Freezing Conditions

Inadvertently, the apparatus containing the fibers as shown in FIG. 9 was exposed to a temperature of approximately −10° C. for several hours. After inspection of the casing 31 and fibers therein, no damage whatsoever was observed. This evinces the fact that the fibers contained no water or damage would have occurred to casing 31 and the fibers.

For the following examples, the method of the Nohmi et al. was employed to illustrate the significant difference between the method as taught in this patent versus that which is disclosed herein.

EXAMPLE 9

The apparatus employed was that illustrated in FIG. 10. The feed in this example comprised 100% kerosene with a feed rate of 480 mlmin$^{-1}$ down-bore from 34 to 33. End 33 was open and thus at atmospheric pressure, as was the shell side. The permeate flux was approximately 0.35 l (min·m$^2$·psi)$^{-1}$.

EXAMPLE 10

A. Down-Bore Mixed Phase Feed

Similar to Example 9, the apparatus of FIG. 10 was employed. The feed in this instance comprised a one-to-one volume % mixture of kerosene and water with the feed rate at 320 mlmin$^{-1}$. The dry kerosene permeate rate was 0.066 l (min·m$^2$·psi)$^{-1}$. As a result of employing the Nohmi et al. method, the effluent contained six (6) volume % kerosene in the water. In addition, pressure readings fluctuated significantly during this sampling procedure.

B. Mixed Phase Feed

Example 10A was repeated using the same apparatus and feed rates with the exception that the feed was 6 vol % kerosene in water. The permeate was dry kerosene with a recovery rate of 0.0046 l (min·m$^2$·psi)$^{-1}$. The water effluent contained approximately 3% by volume of kerosene. FIG. 1 graphically illustrates the results from Examples 10A and 10B.

C. Shell Side Mixed Phase Feed

The experiment was repeated using the same apparatus and feed rates, composition, etc. as set forth with respect to 10A, except that the mixture was fed to the shell side at atmospheric pressure. A pressure of −5 psi NPSH was applied to the lumen of the fibers. The resulting kerosene permeate was water-free. The H$_2$O effluent was devoid of visible free phase kerosene. The kerosene recovery rate was approximately 0.19 l (min·m$^2$·psi)$^{-1}$. This represents a 287% increase in recovery compared to the method of Nohmi et al., under the same conditions i.e. feed rate and composition. Of even further significance is the fact that substantially 100% of the free phase kerosene was removed in one pass using the method set forth herein. Further, substantially 100% of the free phase kerosene was removed in one pass using the method set forth herein as opposed to 88% kerosene as in 10A and 50% in 10B, removal from the feed in single passes using the Nohmi et al. method. This represents an important advance in the field of this technology. FIG. 2 graphically illustrates the quantitative removal of kerosene from water as discussed in Example 10C.

The recovery rate of kerosene as a function of the percentage of kerosene in water is shown in FIG. 1A for examples 9 and 10A through 10C.

EXAMPLE 11

The same feed mixture was employed as that set forth for example 10. The feed rate was 320 mlmin$^{-1}$. As a result of applying −14.5 NPSH to the shell side, the permeate contained 30 volume % water in 70 volume % kerosene. The result was therefore water breakthrough.

The Nohmi et al. method as in the Ford patent (U.S. Pat. No. 4,846,976) and the Taylor patent (U.S. Pat. No. 4,886,603) all generally relate to downbore or down lumen methods of recovering organic materials. In each of these cases, the recovery of the organic material relies on emulsion formation with maximum droplets sizes of generally around 50 μm. The requirement for the emulsification is necessary to prevent extremely large pressure fluctuations that were observed in Examples 10 and 11. Generally speaking, globules of water followed by globules of kerosene caused this effect. It has been found, by practicing the methodology of the present invention that the shell side feed completely circumvents this problem and as a result, the present technology does not require any modification of the feed in terms of preliminary emulsification. This is a distinct advantage over the prior art in that the method may be practiced directly in the field or at a spill site without any concern as to the physical nature of the feed material. This, of course, immediately translates into a more expedited recovery and avoids manual intervention at the site.

In addition to the foregoing, it is clear that the prior art methods did not recognize the utility and superior results that could be obtained by introducing the feed into the shell side by either negative pressure suction or positive pressure force and by recognizing the combination of factors as set forth herein previously such as surface tension effects. In the Taylor patent, it is taught that down-bore or shell side feed is not critical for separation. This is further evidenced by the teachings in the Ford patent, wherein it is indicated that the oil removal works best if the oil-water mixture is fed through the lumens of the fiber. This is in direct contrast to what the present invention sets forth and the results of down-bore feeding such a mixture have not only been addressed previously regarding the difficulty of performing such a procedure with a two-phase mixture, but further the teachings of Ford are completely refuted by the results from Example 11. One only need to compare the results of Example 11 with any of the results from the previous examples in order to readily appreciate that shell side feed introduction results in efficient separation of an organic phase from an aqueous mixture to the point that no free phase water is observable in the organic thus separated.

Based on what has been delineated herein previously, it is clear that there are major advantages immediately realized by shell side feed.

Based on the above data, the addition of negative pressure in the Nohmi et al. method proves to be counterproductive and did not achieve the desirable results of the invention as set forth herein previously.

EXAMPLE 12

Polypropylene Hollow Fiber

A test was employed using the same apparatus as set forth in Example 6, with the exception of the details concerning the apparatus including the following:

| Fiber Data | |
|---|---|
| Inside Diameter | 400 μm |
| Outside Diameter | 460 μm |
| Nominal Average Pore Diameter | 0.1 μm |

This test was conducted using the Mitsubishi KPF 400 polypropylene hollow fiber. The test was run continuously over a 119 hour period with a free-phase water trap in the permeate recycle line. A total of 178,500 ml of oil was recycled through the apparatus. No free-phase water was collected in the trap.

Similar results were achieved using Celanese X-20 polypropylene hollow fibers.

SUMMARY

In all examples, where the organic material was removed from the aqueous mixture by shell side feed, no free phase water was observed indicative of the fact that the organic material was at least substantially anhydrous.

Although the invention has been described with respect to a specific embodiment, it will be appreciated by those skilled in the art that numerous modifications may be made to the invention without departing from the spirit and scope thereof.

I claim:

1. A method of separating a free organic phase comprising at least one liquid organic compound from an aqueous mixture having a free aqueous phase and said free organic phase, comprising the steps of providing a plurality of hollow hydrophobic mircoporous fibers, each of said fibers having a longitudinal bore and micropores extending through each of said fibers to the interior of each fiber;

said micropores having a shape an/or orientation relative to flow of the mixture and a cross-sectional size sufficiently small to exclude entry into said fibers of said aqueous phase due to surface tension of said aqueous phase but permitting entry into said fibers of said at least one organic compound;

maintaining a reduced pressure in said fibers at a level sufficient to induce a reduced sufficient to draw the at least one organic compound into the fibers, but insufficient to overcome the surface tension of said aqueous phase;

contacting said mixture with said fibers; and separating said organic phase from said mixture as a separate organic phase devoid of said aqueous phase.

2. The method as defined in claim 1 further including the step of pretreating said mixture.

3. The method as defined in claim 1, wherein said at least one organic compound comprises diesel fuel.

4. The method as defined in claim 1, wherein said at least one organic compound comprises crude oil.

5. The method as defined in claim 1, further including the step of introducing a chelating agent into said mixture to complex with any metal compounds present in said mixture prior to contacting said mixture with said fibers.

6. The method as defined in claim 1, wherein said at least one compound comprises an edible oil.

7. A method of removing a non-colloidal liquid phase organic compound from an aqueous system containing a mixture of separate liquid phases of at least two different components, one of which is said non-colloidal liquid phase organic compound comprising the steps of:

providing a plurality of hollow hydrophobic microporous fibers, each fiber having an exterior surface, a longitudinal bore and micropores extending through each said fiber to the interior of each fiber;

contacting said exterior surface of the fibers with said aqueous system; said micropores having a shape and/or orientation relative to flow of the mixture and a cross-sectional size sufficiently small to exclude the entry into said fibers of the aqueous component of said system due to surface tension of said aqueous component but permitting entry into said fibers of said liquid phase of said organic compound; and, inducing a pressure drop from the exterior to the interior of said fibers, said pressure drop being sufficient to separate said liquid phase organic compound from said aqueous mixture by passage of the liquid phase of the organic compound into said fibers but insufficient to pass said aqueous component through said micropores to thereby facilitate removal of said organic compound from said mixture.

8. The method as set forth in claim 7, wherein said organic compound comprises a high viscosity liquid.

9. The method as set forth in claim 7, wherein said system is pretreated prior to contact with said fibers.

10. The method as set forth in claim 9, wherein said system containing said compound is preheated prior to contact with said hollow fibers.

11. The method as set forth in claim 9, wherein pretreatment includes dilution of said mixture.

12. The method as set forth in claim 9, wherein pretreatment includes centrifuging.

13. The method as set forth in claim 9, wherein pretreatment includes agitation of said mixture to at least partially reduce the viscosity of said organic compound.

14. A method as defined in claim 7 wherein said pressure inducing step comprises:

inducing a reduced pressure within the longitudinal bore of each said fiber relative to said exterior of each said fiber, said reduced pressure sufficient to draw said organic compound into said fibers but insufficient to draw said aqueous medium through said micropores, to facilitate removal of said organic compound from said aqueous component.

15. The method as set forth in claim 7, wherein said aqueous medium contains soil or sediment.

16. A method as set forth in claim 15, further comprising the step of pretreating said mixture prior to contact with said fibers.

17. A method as set forth in claim 16, wherein said pretreating step includes at least one step selected from the group consisting of heating, filtration, centrifuging, cooling, freezing, dilution and precipitation.

18. The method as set forth in claim 16, wherein said fibers are disposed in intersecting relation relative to one another.

19. The method as set forth in claim 16, wherein said fibers are disposed in a parallel relation relative to one another.

20. The method as set forth in claim 16, wherein said fibers are arranged in a divergent pattern relative to one another.

21. The method as set forth in claim 16, wherein said fibers are arranged to form a mat.

22. The method as set forth in claim 16, wherein said fibers are looped.

23. The method as set forth in claim 16, wherein said fibers include means for maintaining said fibers in spaced and connected relation.

24. A method of purifying oil contaminated with water in a liquid system having said oil in a free phase and in which said system includes a mixture of at least two different free phase components, one of which is said free phase oil, comprising the steps of:

providing a plurality of individual hydrophobic microporous fibers, each fiber of said fibers having an exterior surface and a hollow interior;

inducing a reduced pressure within said fibers relative to the exterior of said fibers;

contacting, under said reduced pressure, said fibers with said liquid system; and drawing said free-phase oil from said system through said hollow interior of said fibers to provide a discrete purified oil phase free of water;

said micropores of said fibers having a shape and/or orientation relative to flow of the liquid system and a cross-sectional size sufficiently small to exclude the entry into said fibers of said water due to surface tension of said water but permitting entry into said fibers of said oil.

* * * * *